United States Patent
Bastos et al.

(10) Patent No.: US 7,623,132 B1
(45) Date of Patent: Nov. 24, 2009

(54) PROGRAMMABLE SHADER HAVING REGISTER FORWARDING FOR REDUCED REGISTER-FILE BANDWIDTH CONSUMPTION

(75) Inventors: Rui M. Bastos, Porto Alegre (BR);
Christian Rouet, San Rafael, CA (US);
Emmett M. Kilgariff, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 517 days.

(21) Appl. No.: 11/019,975

(22) Filed: Dec. 20, 2004

(51) Int. Cl.
*G06T 1/20* (2006.01)
*G09G 5/36* (2006.01)

(52) U.S. Cl. ...................... 345/506; 345/559

(58) Field of Classification Search ................. 345/426, 345/589, 600, 506, 541, 559
See application file for complete search history.

(56) References Cited

U.S. PATENT DOCUMENTS

| | | | | |
|---|---|---|---|---|
| 6,229,553 B1* | 5/2001 | Duluk et al. | ................ | 345/506 |
| 6,259,460 B1* | 7/2001 | Gossett et al. | .............. | 345/552 |
| 6,268,875 B1* | 7/2001 | Duluk et al. | ................ | 345/506 |
| 6,664,962 B1* | 12/2003 | Komsthoeft et al. | ........ | 345/426 |
| 6,809,732 B2* | 10/2004 | Zatz et al. | .................... | 345/503 |
| 6,825,843 B2* | 11/2004 | Allen et al. | .................. | 345/522 |
| 6,864,893 B2* | 3/2005 | Zatz | ........................... | 345/503 |
| 6,897,871 B1* | 5/2005 | Morein et al. | ................ | 345/501 |
| 6,963,345 B2* | 11/2005 | Boyd et al. | .................. | 345/559 |
| 6,980,209 B1* | 12/2005 | Donham et al. | ............. | 345/426 |
| 7,034,828 B1* | 4/2006 | Drebin et al. | ................ | 345/426 |
| 7,109,987 B2* | 9/2006 | Goel et al. | ................... | 345/423 |
| 7,176,917 B1* | 2/2007 | Morgan et al. | .............. | 345/426 |
| 7,439,979 B1* | 10/2008 | Allen et al. | .................. | 345/506 |
| 2004/0012598 A1* | 1/2004 | Zatz | ........................... | 345/506 |
| 2005/0225554 A1* | 10/2005 | Bastos et al. | ................ | 345/506 |
| 2005/0243094 A1* | 11/2005 | Patel et al. | ................... | 345/506 |
| 2006/0071933 A1* | 4/2006 | Green et al. | ................. | 345/426 |
| 2006/0125825 A1* | 6/2006 | Law et al. | .................... | 345/426 |
| 2007/0097123 A1* | 5/2007 | Loop et al. | ................... | 345/442 |

OTHER PUBLICATIONS

E. Lindholm, M. Kilgard, and H. Moreton. A User-Programmable Vertex Engine. In Proceedings of the 28th annual conference on Computer graphics and interactive techniques, Aug. 2001, p. 149-159. ACM SIGGRAPH 2001, Aug. 12-17, 2001, Los Angeles, CA, USA.*

E. Lindholm, M. Kilgard, and H. Moreton. A User-Programmable Vertex Engine. In Proceedings of the 28th annual conference on Computer graphics and interactive techniques, Aug. 2001, p. 149-159. ACM SIGGRAPH 2001, Aug. 12-17, 2001, Los Angeles, CA, USA.*

* cited by examiner

*Primary Examiner*—Ryan R Yang
(74) *Attorney, Agent, or Firm*—Patterson & Sheridan, LLP

(57) ABSTRACT

A method and apparatus of operating a shader having multiple texture or shader processing stations. That method includes feeding the output of a texture or shader processing station directly into the input of another texture or shader processing station. Further, only a subset of the processing stations has access to a shader register file.

22 Claims, 6 Drawing Sheets

PROGRAMMABLE SHADER HAVING REGISTER FORWARDING FOR REDUCED REGISTER-FILE BANDWIDTH CONSUMPTION

BACKGROUND OF THE INVENTION

1. Field of the Invention

This invention relates to computer systems, and more particularly to programmable shaders.

2. Description of the Related Art

Graphics processing is an important feature of modern high-performance computing systems. In graphic processing, mathematical procedures are implemented to render, or draw, large numbers of graphic primitives, e.g., triangles or rectangles, on a display to produce desired visual images. Real time graphics processing is based on the high-speed processing of data to form graphic primitives to produce visually pleasing moving images.

Early graphic systems were limited to displaying image objects comprised of graphic primitives having smooth surfaces. That is, visual textures, bumps, scratches, or other surface features were not modeled in the graphics primitives. To enhance image quality, texture mapping of real world attributes was introduced. In general, texture mapping is the mapping of an image onto a graphic primitive surface to create the appearance of a complex graphic primitive without the high computational costs associated with rendering actual three dimensional details.

Graphics processing is typically performed using application program interfaces (API's) that provide a standard software interface that can be run on multiple platforms, operating systems; and hardware. Examples of API's include the Open Graphics Library (OpenGL®) and D3D™. In general, such open application programs include a predetermined, standardized set of commands that are executed by associated hardware. For example, in a computer system that supports the OpenGL® standard, the operating system and application software programs can make calls according to that standard without knowing any of the specifics regarding the system hardware. Application writers can use APIs to design the visual aspects of their applications without concern as to how their commands will be implemented.

APIs are particularly beneficial when they are supported by dedicated hardware. In fact, high-speed processing of graphical images is often performed using special graphics processing units (GPUs) that are fabricated on semiconductor substrates. Beneficially, a GPU can be designed and used to rapidly and accurately process commands with little impact on other system resources.

FIG. 1 illustrates a simplified block diagram of a graphics system 100 that includes a graphics processing unit 102. As shown, that graphics processing unit 102 has a host interface/front end 104. The host interface/front end 104 receives raw information from a central processing unit 103 that is running an application program stored in memory 105. The host interface/front end 104 buffers input information and supplies that information to a geometry engine 106. The geometry engine has access to a frame buffer memory 120 via a frame buffer interface 116. The geometry engine 106 produces, scales, rotates, and projects three-dimensional vertices of graphics primitives in "model" coordinates that are stored in the frame buffer memory 120 into two-dimensional frame-buffer co-ordinates. Typically, triangles are used as graphics primitives for three-dimensional objects, but rectangles are often used for 2-dimensional objects (such as text displays).

The two-dimensional frame-buffer co-ordinates of the vertices of the graphics primitives from the geometry engine 106 are applied to a rasterizer 108. The rasterizer 108 identifies the positions of all of the pixels within the graphics primitives. This is typically performed along raster (horizontal) lines that extend between the lines that define the graphics primitives. The output of the rasterizer 108 is referred to as rasterized pixel data.

The rasterized pixel data are applied to a shader 110 that processes input data (code, position, texture, conditions, constants, etc) using a shader program (sequence of instructions) to generate output data. While shaders are described in relation to their use in graphics processing, shaders are, in general, useful for other functions. Shaders can be considered as a collection of processing capabilities that can process large amounts of data at high speed, such as by parallel handling of data.

The shader 110 includes a texture engine 112 that processes the rasterized pixel data to have the desired texture and optical features. The texture engine 112, which has access to the data stored in the frame buffer memory 120, can be implemented using a hardware pipeline that processes large amounts of data at very high speed. The shaded pixel data is then sent to a Raster Operations Processor 114 (Raster op in FIG. 1) that optionally performs additional processing on the shaded pixel data. The result is pixel data that is stored in the frame buffer memory 120 by the frame buffer interface 116. The frame pixel data can be used for various processes such as being shown on a display 122.

Hardwired shaders 110 are known. For example, shaders can include hardwired pixel processing pipelines that perform standard API functions, including such functions as scissor, Alpha test; zbuffer, stencil, blendfunction; logicop; dither; and writemask. Also known are programmable shaders 110, devices that can be programmed and that enable an application writer to control shader processing operations.

Programmable shaders enable great flexibility in the achievable visual effects and can reduce the time between a graphics function being made available and that function becoming standardized as part of a graphics API. Programmable shaders can have a standard API mode in which standard graphics API commands are directly implemented and a non-standard mode in which new graphics features can be programmed.

Programmable shaders usually having shader engines 112 with multiple shader processing stations, each of which can perform specified functions. FIG. 6 illustrates a prior art shader engine architecture 600. In that architecture, program information is applied via a bus 608 to multiple shader processing stations: a first computation unit 602, a texturizer 604 and a second computation unit 606. The first computation unit 602 can perform certain processing operations on pixel information applied via a bus 614. The computational results are then stored in a memory that is referred to herein as a shader register file 620. The computational results from the first computation unit 602 are recalled from the shader register file 620 by the texturizer 604, which performs further processing, and those results are then stored in the shader register file 620. Then, the second computation unit 606 recalls the results of the texturizer 604, performs other processing operations, and the results are stored back in the shader register file 620. This process enables program information to control the operations of the individual shader processing stations to produce a final result produced by multiple operations. The general scheme of FIG. 6 can be extended by adding more shader processing stations that can recall data from and store data in the shader register file 620.

While the shader engine architecture 600 is useful, it is not without problems. First, is relatively difficult to fabricate a shader register file 620 that can be accessed by multiple shader processing stations. The more there are the more difficult it becomes. Complicating that problem is that testing the operation of a shader engine that is in accord with the shader engine architecture 600, both to eliminate design flaws (including hardware and software, and specifically including compilers and other auxiliary and support services) and to verify the operation of devices after fabrication, is difficult. Furthermore, the actual layout of a shader engine that is in accord with the shader engine architecture 600 is simply difficult.

Therefore, a new shader engine architecture would be beneficial. Particularly beneficial would be a new shader engine architecture having a reduced number of shader stations that can access data in a shader register file. A new shader engine architecture having a shader register file whose operation is easier to test would be particularly beneficial. Methods of operating a shader engine having multiple shader processing stations that do not require storing of all intermediate results would be useful.

SUMMARY OF THE INVENTION

The principles of the present invention provide for a shader engine architecture that has multiple texture or shader processing stations that can each perform texture or shader operations, and a shader register file that is addressable by a subset of those stations. Embodiments of the present invention are implemented such that the results of one texture or shader processing station feed directly into a subsequent texture or shader processing station without going through a shader register file. Intermediate results, which can be required because of programming organization and looping, can still be stored in a shader register file via a subset of the texture or shader processing stations.

Embodiments of the present invention provide for looping through a texture or shader engine such that the results of one texture or shader processing station directly feeds into a subsequent texture or shader station, such that intermediate results, if required, can pass through one or more texture or shader stations and into shader register file, and such that the contents of the shader register file can be recalled, processed, and, if required, presented to another texture or shader processing station.

The principles of the present invention further provide for a method of operating a texture or shader engine having multiple texture or shader processing stations such that the results from one texture or shader processing station are directly applied to the input of another texture or shader processing station. The principles of the present invention further provide for selectively storing results, intermediate or final, in a shader register file that is addressable only by a subset of the texture or shader processing stations.

BRIEF DESCRIPTION OF THE DRAWINGS

The foregoing and other aspects and advantages are better understood from the following detailed description of a preferred embodiment of the invention with reference to the drawings, in which.

DETAILED DESCRIPTION

The principles of the present invention provide for a new, programmable processing engine architecture having multiple texture or shader processing stations and a shader register file. The individual texture or shader processing stations can perform texture or shader operations, and the results from one texture or shader processing station feed directly into another texture or shader processing station. A shader register file, addressable only by a subset of the texture or shader processing stations, is available to store intermediate and final results. The contents of the shader register file can be recalled, processed and, if required, presented to another texture or shader processing station via a subset of the texture or shader processing stations. The principles of the present invention further provide for a method of operating a processing engine such that the result of one texture or shader processing station are input to a subsequent texture or shader processing stations. Intermediate and/or final results can be stored in a shader register file by a subset of the texture or shader processing stations.

Figure 1:
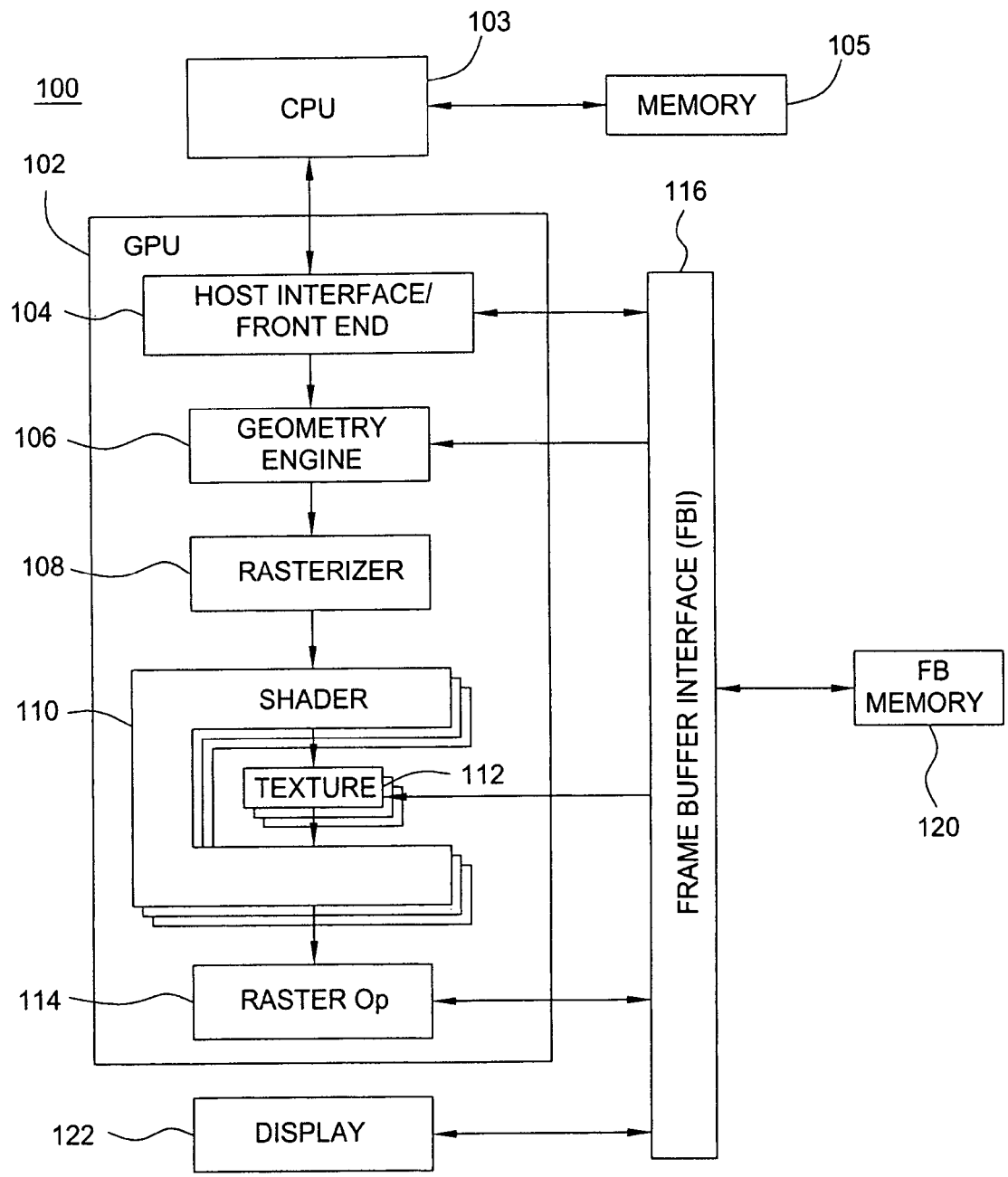
FIG. 1 schematically illustrates a prior art graphics system.
Figure 2A:
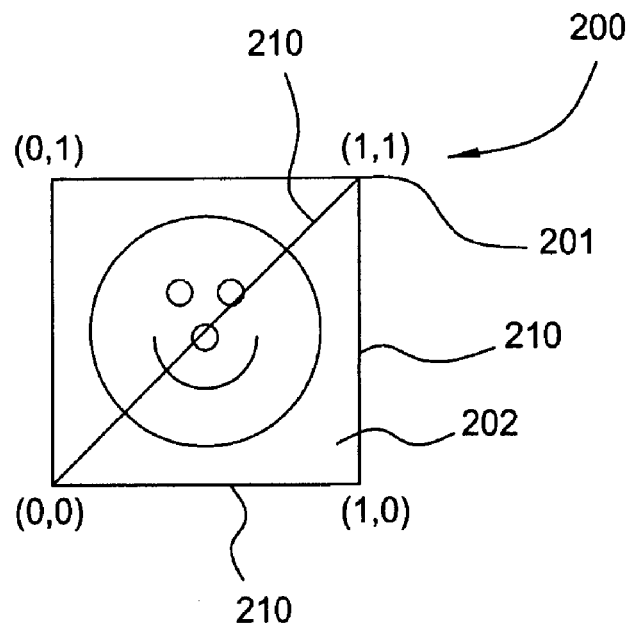
FIG. 2A schematically illustrates a triangle geometric primitive.

To better understand the new processing engine architecture and method of operating texture or shader engines it may be helpful to understand shading in more detail. Again, while the following relates to graphical operations, in general, shaders are useful for applications other than graphical processing. Referring back to FIG. 1, the inputs to a shader can be two-dimensional display co-ordinates of the vertices of the graphics primitives used in the graphics system. Furthermore, the texture station 112 (or a shader station) has access to data in the frame buffer memory 120. Typically, but not always, those graphic primitives are triangles. For example, FIG. 2A illustrates the coordinates (0,0), (1,0), and (1,1) of the vertices that define a graphic primitive triangle 202. If rectangles are used, the additional coordinate (0,1) would be included in the graphics primitive. However, except for two-dimensional objects such as text, triangles are more common.

Figure 2B:
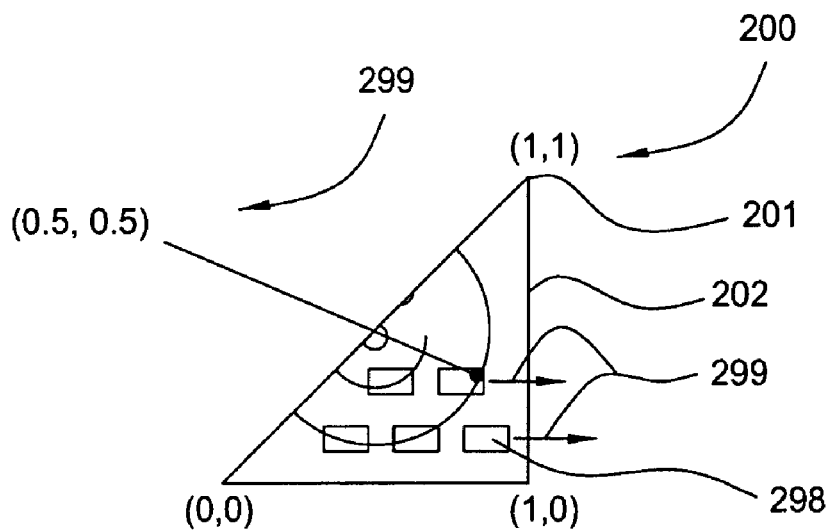
FIG. 2B illustrates a triangle geometric primitive having pixels aligned along each scan line.

Once the vertices 201 of the triangle 202 are known, the pixels within the graphical primitive are determined since they are the pixels located between the lines 210 that form the graphic primitive. Usually the pixels are organized along raster scan lines. For example, FIG. 2B illustrates a plurality of pixels 298 within the triangle 202 that are aligned by scan lines 299.

Figure 3:
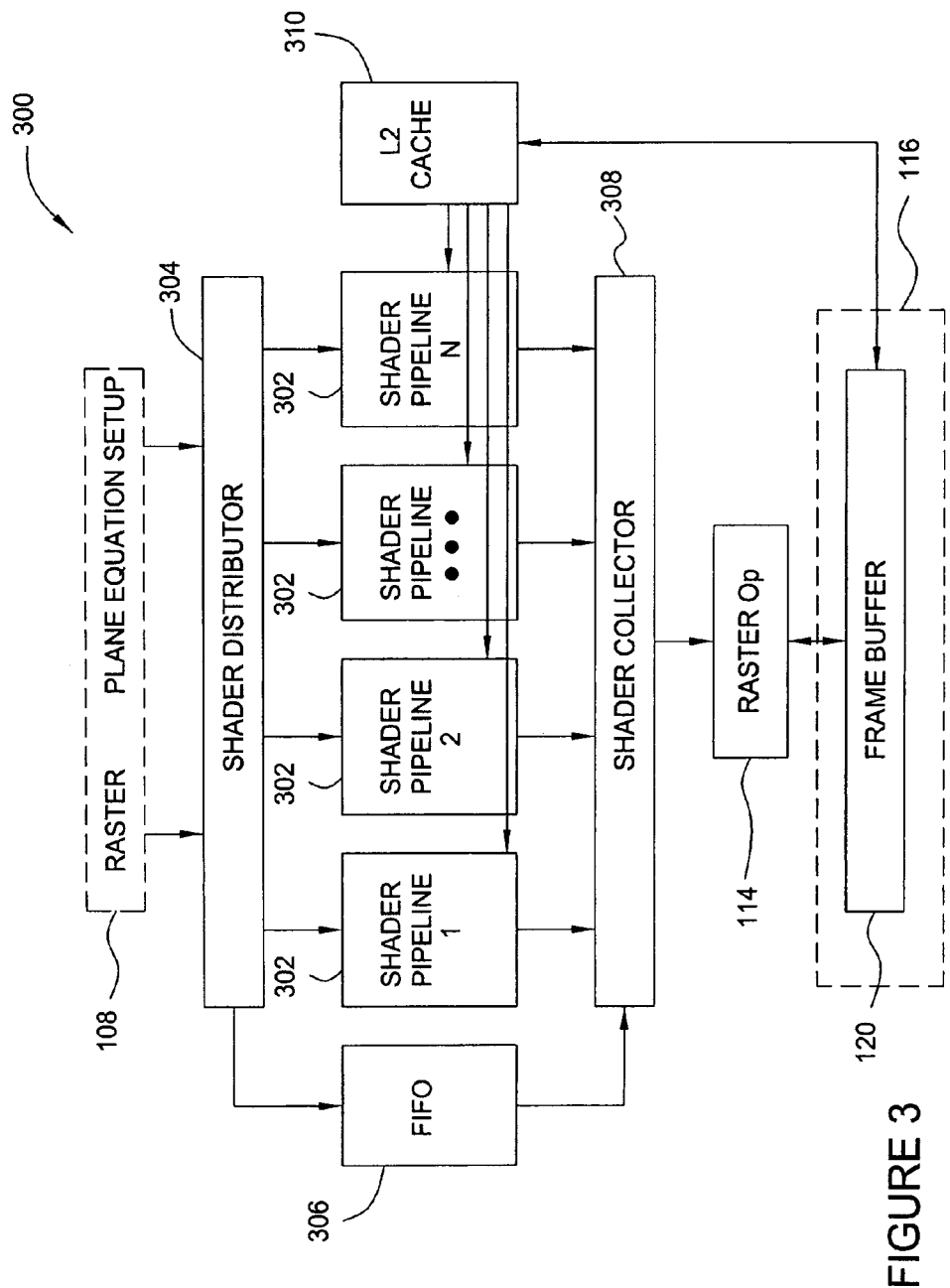
FIG. 3 is a high-level block diagram of a shader architecture having multiple shader pipelines, each including a processing (texture or shader) engine, and that is in accord with the principles of the present invention.

FIG. 3 is a high-level block diagram of a shader 300 having features that are in accord with the principles of the present invention. The shader 300 represents a new, useful, and unobvious embodiment of a generic shader 110 shown in FIG. 1. The shader 300 converts the rasterized pixel data (which has raw X, Y per fragment and plane equations for per-vertex attributes such as color, depth, texture, coordinates, etc) from the rasterizer 108 into appropriate color and depth values for each pixel that is to be sent to the frame buffer. To do so, the shader 300 executes large numbers of operations to resolve mathematical equations in response to API functions and in response to application program instructions to produce the desired color and depth values to form shaded pixel data. A copy of the application program instructions is typically stored in the frame buffer memory 120. Because there may be numerous application program instructions, and because the shader 300 has limited programmability, the application program instructions are fetched as required from the frame buffer memory 120 and applied to a programming processor (not shown for clarity) that sends subsets of the application program instructions as programming commands (called fragment programs) to various processing stations, some of which are described in more detail subsequently. After additional processing by the Raster Operations Processor, the shaded pixel data is converted into frame pixel data that is stored by the frame buffer interface 116 in the frame memory 120 (reference FIG. 1).

A notable feature of the shader 300 is its multiple shader pipelines 302. Each shader pipeline 302 can be individually programmed to perform mathematical and other processing operations on rasterized pixel data to produce shaded pixel data. While the shader 300 is shown as having four shader pipelines 302, there could, in general, be from 1 to N shader pipelines 302, where N is an integer. This scalability can be used to control shader processing power by simply adding/subtracting shader pipelines. Furthermore, such scalability enables shader pipeline 302 redundancies, which, in turn, enables the ability to functionally disable defective or otherwise unused shader pipelines 302, while still maintaining the overall operation of the shader 300.

The shader 300 also includes a shader distributor 304. One function of the shader distributor 304 is to distribute information from the rasterizer 108 (rasterized pixel data) to the various shader pipelines 302 so that they may process the rasterized pixel data in accord with programming commands. Beneficially this distribution is performed in a manner that provides for a balanced workload between the shader pipelines 302. That is, each shader pipeline 302 performs similar amounts of processing and none is preferred over the others. Another function of the shader distributor 304 is to process the data from the rasterizer 108 such that the shader pipelines 302 only receive what they require.

A portion of control data, referred to as state data, that is not used by the shader pipelines 302 is applied by the shader distributor 304 to a first in/first out buffer memory 306. Besides state data, the first in/first out buffer memory 306 also receives X-Y coordinate and pixel coverage data, which also do not go through the shader pipelines 302.

Because the shader pipelines 302 independently process rasterized pixel data, the outputs of the shader pipelines 302 have to be organized in such a manner that the resulting processed pixel data is properly matched with the pixels in the frame buffer 120 (by raster scan lines). The shader 300 therefore includes a shader collector 308 that receives the outputs of the shader pipelines 302 and the outputs of the first in/first out buffer memory 306, and that organizes the results of the shader operations to produce shaded pixel data for the Raster Operations Processor 114 (ROP).

The output of the shader collector 308 is applied via the frame buffer interface 116 to the frame buffer memory 120, and thus to the display 122. Since the shader pipelines 302 can all request data from the frame buffer memory (as described subsequently), the shader 300 includes an L2 cache memory 310 to assist in that process. It is through the texture requests that the required program instructions can be obtained from the frame buffer memory 120.

Figure 4:
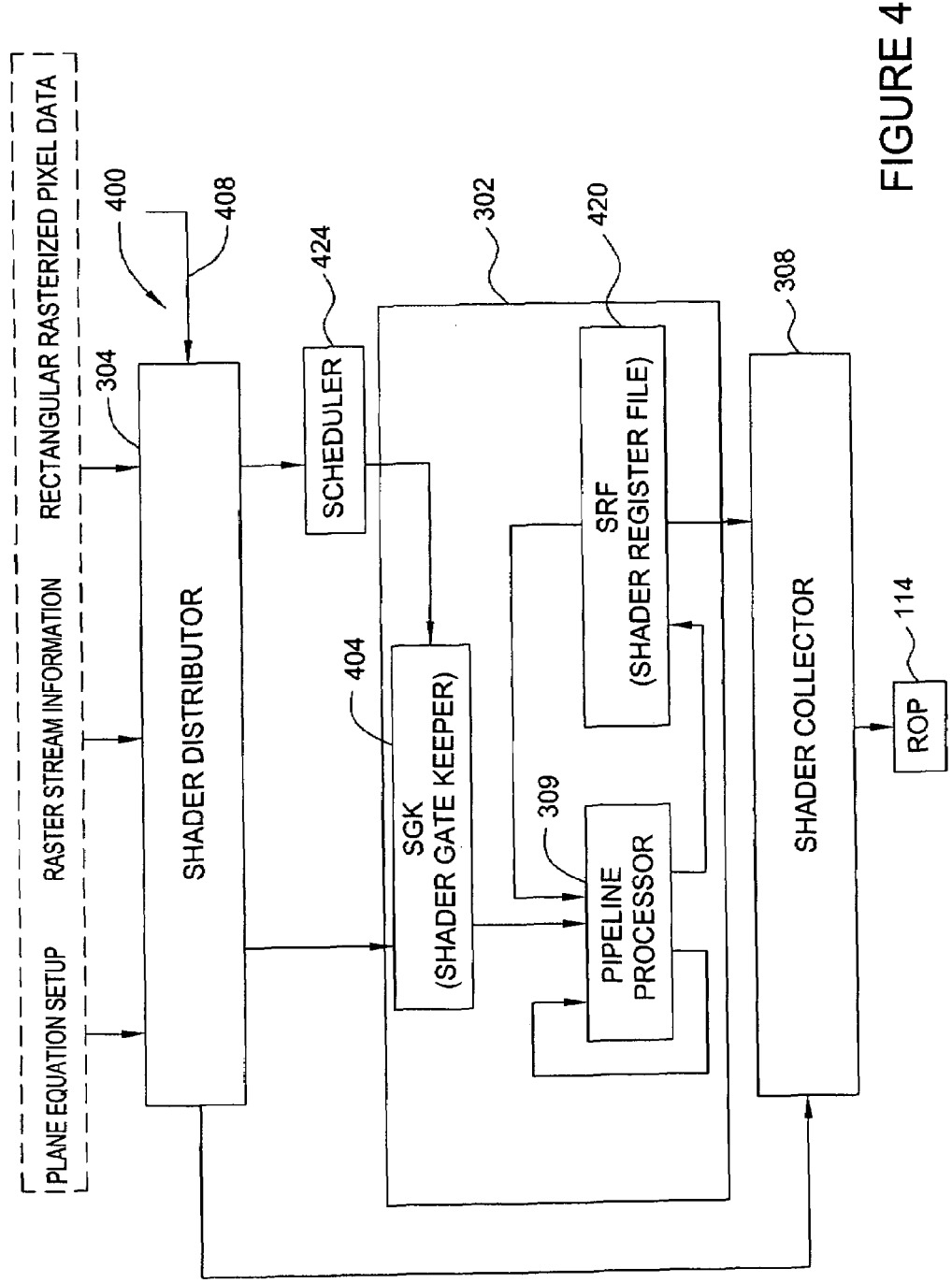
FIG. 4 is a block diagram that illustrates selected features of the shader architecture shown in FIG. 3.

While the foregoing overview of the shader 300 is useful, a more detailed introduction to features of the shader 300 will assist understanding the principles of the present invention. To that end, FIG. 4, which shows only one shader pipeline 302, albeit in more detail, and additional features will be described. The shader distributor 304 receives information from the rasterizer 108 and distributes that information to a shader gate keeper 404 within the shader pipeline 302.

Since a shader pipeline 302 can process only a limited number of pixels at a time, the data into the shader gate keeper 404 is applied as groups called segments. There are multiple reasons to segment, load-balancing being one, and workload size limitations being another. The number of pixels that can be handled by a single shader pipeline 302 is also limited by memory storage capacities of a shader register file (RAM) 420 and of the shader gatekeeper 404 itself.

The shader gatekeeper 404 also receives program commands from a scheduler 424. The shader gate keeper 404 passes those program commands and incoming segment data to a pipeline processor 309, also described in more detail subsequently. The pipeline processor 309 processes the segment data in line with the program commands. Temporary storage and output buffering is provided by the shader register file 420. The interaction of the pipeline processor 309 and the shader register file 420 is explained below.

After shaded pixel data has been processed, the shader collector 308 collects the shaded pixel data from the shader register file of the shader pipelines 302 and combines that data with X, Y, and coverage data from the first in/first out buffer memory 306 (see FIG. 3) to form an organized shader pixel data packet. As noted previously, the resulting data is sent to a Raster Operations Processor 114 that performs additional processing.

Figure 5:
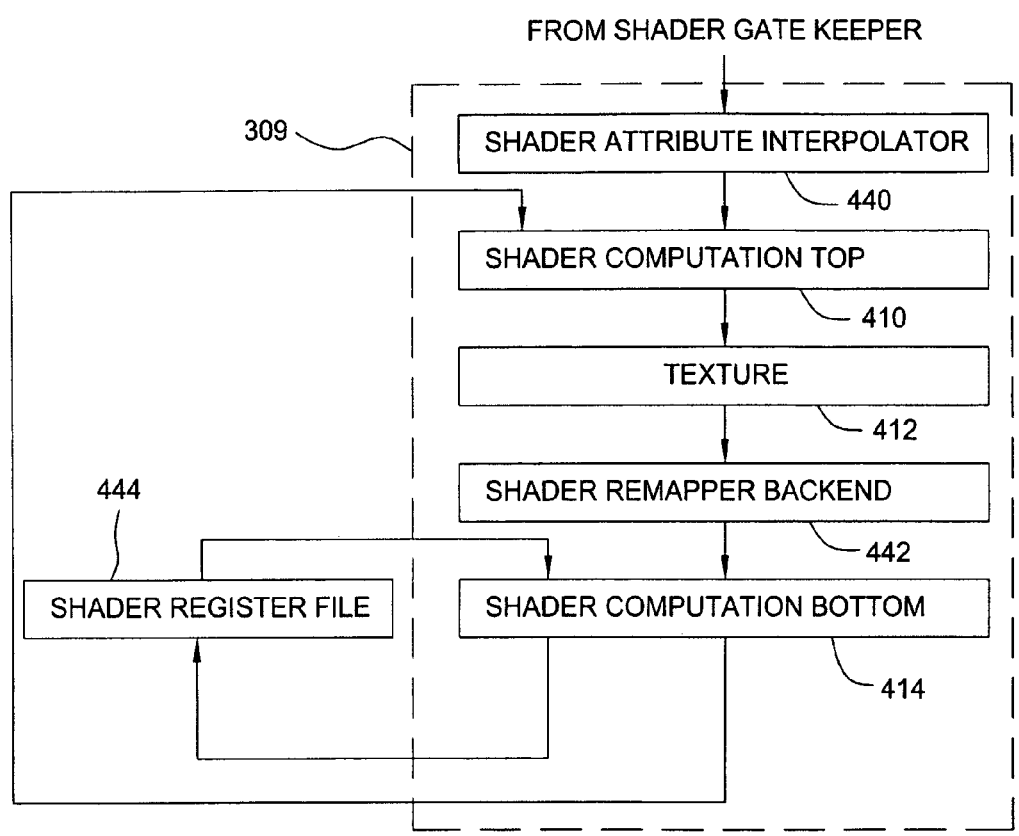
FIG. 5 illustrates selected features of a processing engine in the shader architecture shown in FIGS. 3 and 4.

The pipeline processor 309, which is a programmable shader engine, is shown in more detail in FIG. 5. The pipeline processor 309 received information from the shader gatekeeper 404 in a shader attribute interpolator 440. The shader attribute interpolator 440 is responsible for producing interpolated attributes, which include texture coordinates, barycentric coefficients, and depth (z or w) to the incoming data. Interpolation in the shader attribute interpolator 440 is done using Sum-of-Products (SOP) arithmetic units. Since the shader attribute interpolator 440 has six SOPs arithmetic units, six values can be interpolated. Due to perspective correction and the use of barycentric coefficients, there is not a one-to-one mapping of attribute components to the SOPs arithmetic units. Barycentric coefficients, A and B, are used for computing interpolated primary and secondary colors, and interpolated fog distance.

The output of the shader attribute interpolator 440 is applied to a shader computation top 410. This unit is the top unit of a loop structure. The main responsibility of the shader computation top 410 is perspective correction of the interpolated attributes incoming from the shader attribute interpolator 440. Perspective correction demands reciprocation of 1/w (or q/w), to produce w (or w/q), followed by multiplication of the scalar interpolated attribute by w (or w/q). There is one reciprocal unit and four multipliers available in the shader computation top 410. Since attribute interpolation is not required all the time, the shader computation top 410 is also configured to perform the scalar-reciprocation operation (RCP) and the 4-component multiplication operation, MULR or MULH.

The input operands of the shader computation top 410 can come not only from the shader attribute interpolator 440, but also from a shader register file 444, via a shader computation bottom 414 (discussed subsequently), or from the shader computation bottom 414 itself. The shader computation top 410 can also receive data in the form of vector constants.

Briefly the shader computation top 410 supports swizzling and input modifiers (neg, abs, nabs) for all operands and per-operand input clamping, supports output scaling (⅛, ¼, ½, 2, 4, or 8) and clamping ([0,1], [1,1], or [2,2], H and R) for its outputs, supports condition-code compare, update, swizzle, and writemask for all legal opcodes, and performs color and fog interpolation using barycentric coordinates computed in the shader attribute interpolator 440.

Significantly, the output of the shader computation top 410 is directly input to a texture unit 412 that works with a shader remapper and Backend 442. Those units perform texture lookups and remapping of data into floating point 16 or floating point 32 values which are then input to a shader computation bottom 414. The texture processing station 412 and the shader remapper and Backend 442 can execute all unpack (UP*) instructions and the optimized NRM instruction. The texture processing station 412 and the shader remapper and Backend 442 also compute the fog fraction. For the NRM instruction, the texture processing station 412 and the shader remapper and Backend 442 provide hardware supports for output scaling and output clamping, while for texture instructions and unpack instructions, output clamping, but not output scaling, is supported.

The texture processing station 412 (or a shader processing station) and the shader remapper and Backend 442 also support condition-code compares, condition-code updates, condition-code swizzle, and condition-codes as writemasks for DDX, DDY, NRM, TEX, TXP, TXD, TXB, and TXL operations, and support execution of two separate instructions in parallel, but is not symmetric. That is, one instruction can be any texture, unpack, DDX or DDY instruction, and the other instruction can only be NRM. The two parallel instructions cannot depend on each other (data dependencies). The two instructions can operate in parallel regardless of the number of texture coordinates needed for the texture instruction. The NRM instruction generates a three-component xyz vector, and a NRM instruction that tries to write to a w component is treated as a NOP.

Significantly, the output of the shader remapper and Backend 442 is applied directly to the shader computation bottom 414. The shader computation bottom 414 includes four multiple-add arithmetic units and a MultiFunc unit. The MultiFunc unit can perform the scalar instructions: EX2, LOG 2, SIN, and COS (RCP and DIV instructions must happen in the shader computation top 410). Furthermore, if MultiFunc is used, only three of the MAD units can be used. The shader computation bottom 414 supports swizzling, input modifiers (neg, abs, nabs), and input clamping for all operands, as well as output scaling and output clamping, condition-code compare, update, and writemask for all legal opcodes (as listed above). Shader computation bottom instructions can receive up to three input sources.

The shader computation bottom 414 supports execution of two separate instructions in parallel on xy[z] and [z]w components (i.e., either a "3 and 1" or "2 and 2" pair of instructions), with independent input muxing, swizzling, and modifiers; condition code generation and testing; and output scaling and clamping. The only restriction (beyond register limits) is that the two parallel instructions cannot depend on each other (data dependencies).

The shader pipeline 309 provides for looping under program control. Data from the shader computation bottom 414 can pass back up to the shader computation top 404. This enables additional segment processing before having to re-load the shader with a new segment of fragments.

It is to be noted that the shader computation bottom 414 has direct access into (WRITE operations) and from (READ operations) the shader register file 444. In fact, only the shader computation bottom 414 can directly access a shader register file 444. Access to and from the shader register file 444 by all other texture processing stations are through the shader computation bottom 414.

Figure 6:
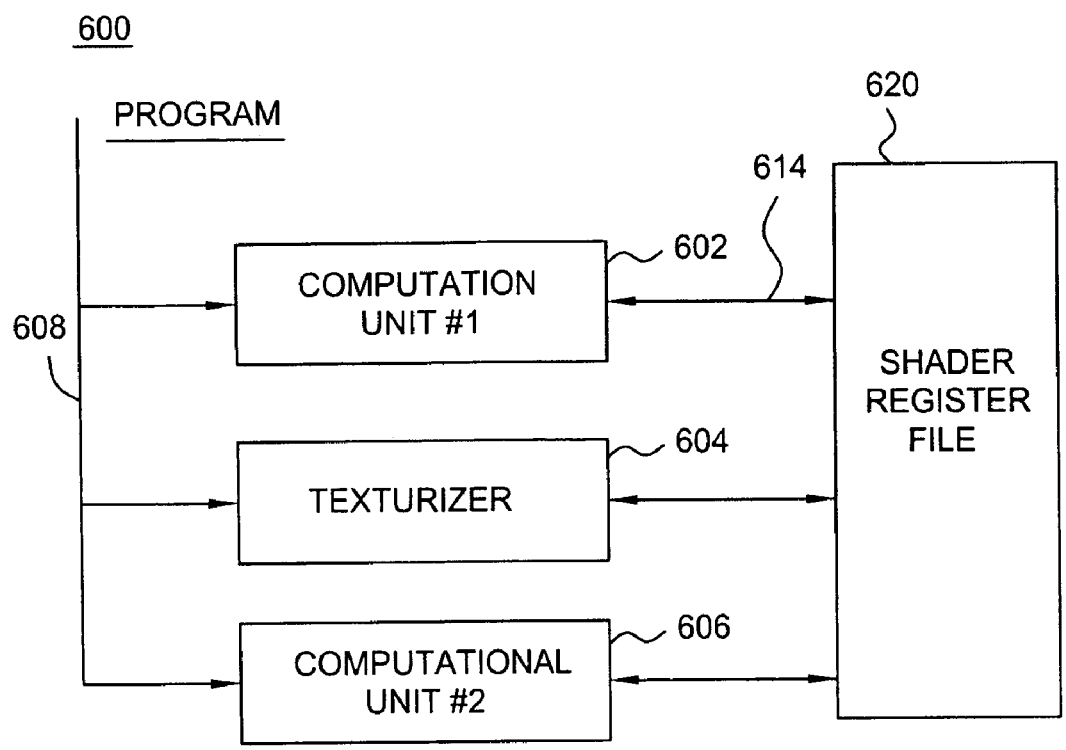
FIG. 6 illustrates a prior art processing engine architecture.

FIGS. 5 and 6 will help illustrate how the pipeline processor 309 differs from prior art processors. In FIG. 5, the shader register file 444 has only one set of access ports, which makes it easier to fabricate and test. However, in FIG. 6, the shader register file 620 is directly accessible by all processing stations. Second, in FIG. 5 all processing results pass directly from one processing station to the next. The shader computation top 410 performs its functions (as specified by a VLIW) and sends its results directly to the texture station 412. The texture station 412 performs its specified functions and sends its results directly to the shader remapper backend 442, which sends its results directly to the shader computation bottom 414. However, in FIG. 6, all results go to and are accessed from the shader register file 620.

Provided that a shader engine is efficiently programmed, passing the results of one processing station directly into a subsequent processing station, as well as limiting access to a shader register file to a subset of the processing stations, is highly advantageous. The effective read and write bandwidths of the shader register file is increased (because reads and writes are less common), increasing performance. Furthermore, computations can be more efficiently performed by pipelining inputs to outputs, the layout of the shader is dramatically simplified since fewer shader register file access ports are required, and testing is simplified. A pipeline processor that is in accord with the present invention still provides for temporary storage in a shader register file. Intermediate results can be stored and final results can be buffered.

It should be understood that all outputs from one processing station can not necessarily be used by the subsequent processing station, and it should be understood that not all operations can be performed without temporary storage. Some of these limitations are addressable by compiler design, some are addressable by efficient hardware implementations, and some appear to be results of fixed rules.

Compiler designs beneficially should include optimizing operand pairs such that the output of one processing station is the proper operand and is in the proper format (32 floating point verses integer, for example) for the next processing station. This, of course, depends on how the particular processing stations are implemented, as well as on the graphics programming steps that will be performed. However, in general, looping should be minimized and/or used effectively.

Hardware design should be performed with the following general rules for register forwarding kept in mind. Those rules are believed to be true, or at least generally true, independent of hardware implementations. That is, in some cases forwarding results from one processing station to a register file will have to be, or should be, performed. It should be clearly understood, that even by following the general rules provided below that to maximize performance shader pipeline testing and experimentation will be required. For example, if a first instruction uses condition codes to conditionally write components of a register, then those components cannot be forwarded to a second instruction because they might not be the correct values (see General Rule 2, below).

Register Forwarding General Rule 1: A register read might be avoided on the second instruction if all read bits were written by the first instruction.

Register Forwarding General Rule 2: A register read on the second instruction cannot be avoided if the first instruction tests a condition code.

Register Forwarding General Rule 3: A register write might be avoided on the first instruction if all written bits are overwritten by the second instruction.

Register Forwarding General Rule 4: A register write on the first instruction cannot be avoided if the 2nd instruction tests the condition code.

Register Forwarding General Rule 5: Mixed precision register overlap between the two instructions is allowed.

Register Forwarding General Rule 6: Serialized instructions (TXD and fat or semi-fat texture lookup) cannot have their source or destination register optimized away (since scratch cannot be preserved between each pixel). An instruction cannot optimize its read if the previous instruction is serialized and cannot optimize its write if the next instruction is serialized.

Register Forwarding General Rule 7: If there is a cache miss or a branch label on the second instruction, then both read and write optimizations must be cancelled.

While various embodiments have been described above, it should be understood that they have been presented by way of example only, and not limitation. The foregoing references to specific number, for example the use of quads are for purposes of explanation and illustration only. Thus, the breadth and scope of a preferred embodiment should not be limited by any of the above described exemplary embodiments, but should be defined only in accordance with the following claims and their equivalents.

The invention claimed is:

1. A shader, comprising:
   a processing engine for processing data, the processing engine having a plurality of serially connected processing stations in which an output of each of the plurality of serially connected processing stations is an input to another of the plurality of serially connected processing stations; and
   a shader register file directly connected only to a first processing station in the plurality of serially connected processing stations and to no other processing station in the shader or processing engine,
   wherein the processing engine is configured to forward results to the shader register file through the first processing station by following a set of rules, including a first rule that a shader register write is performed for a first instruction when a second instruction that immediately follows the first instruction is a serialized instruction, and, a second rule that a shader register read is performed for a third instruction that immediately follows the second instruction,
   wherein the shader register file can only store data received directly from the first processing station, and
   wherein the shader register file can only send stored data directly to the first processing station.

2. A shader according to claim 1, wherein the processing engine is for processing graphics data.

3. A shader according to claim 1, wherein the plurality of serially connected processing stations loop such that the data can be passed from a top processing station to a bottom processing station, and then from the bottom processing station to the top processing station, wherein data is passed via intermediate processing stations residing between the top processing station and the bottom processing station.

4. A shader according to claim 3, wherein data from any processing station of the plurality of serially connected processing stations can be stored in the shader register file only by the first processing station.

5. A shader according to claim 1, further comprising:
   a shader distributor configured to distribute data to a buffer memory and to the processing engine, wherein the data distributed to the buffer memory is state data that contains control data not used by the processing engine; and
   a shader collector configured to receive buffered data from the buffer memory and processed data from the processing engine, and further configured to organize the buffered data to properly match the processed data.

6. A shader according to claim 1, wherein the shader register file is only addressable by the first processing station.

7. A computer system, comprising:
   a central processing unit for running an application program; and
   a graphics processing unit responsive to the central processing unit, the graphics processing unit for processing data in accord with the application program, the graphics processing unit including a shader comprising:
      a processing engine for processing data in accord with the application program, the processing engine having a plurality of serially connected processing stations in which an output of each of the plurality of serially connected processing stations is an input to another of the plurality of serially connected processing stations; and
      a shader register file directly connected only to a first processing station in the plurality of serially connected processing stations and to no other processing station in the shader or processing engine,
      wherein each one of the processing stations is configured to forward results to the shader register file through the first processing station by following a set of rules, including a first rule that a shader register write is performed for a first instruction when a second instruction that immediately follows the first instruction is a serialized instruction, and, a second rule that a shader register read is performed for a third instruction that immediately follows the second instruction,
      wherein the shader register file can only store data received directly from the first processing station, and
      wherein the shader register file can only send stored data directly to the first processing station.

8. A computer system according to claim 7, wherein the computer system includes a scheduler for sending programming commands to program the processing engine.

9. A computer system according to claim 7, wherein the processing engine is for processing graphics data and the data is the graphics data.

10. A computer system according to claim 7, wherein the plurality of serially connected processing stations loop such that the data can be passed from a top processing station to a bottom processing station, and then from the bottom processing station to the top processing station, wherein data is passed via intermediate processing stations residing between the top processing station and the bottom processing station.

11. A computer system according to claim 10, wherein the data from any processing station of the plurality of serially connected processing stations can be stored in the shader register file only by the first processing station.

12. A computer system according to claim 7, wherein the graphics processing unit is further comprising:
   a shader distributor configured to distribute data to a buffer memory and to the processing engine, wherein the data distributed to the buffer memory is state data that contains control data not used by the processing engine; and a shader collector configured to receive buffered data from the buffer memory and processed data from the processing engine, and further configured to organize the buffered data to properly match the processed data.

13. A computer system according to claim 7, wherein the shader register file is only addressable by the first processing station.

14. A graphics processing integrated circuit, comprising:
a front end for receiving raw graphic data;
a geometry engine for organizing the raw graphics data into geometric primitives;
a rasterizer for converting the geometric primitives into rasterized pixel data; and
a shader for shading the rasterized pixel data, the shader comprising:
  a processing engine for processing the rasterized pixel data, the processing engine having a plurality of serially connected processing stations in which an output of each of the plurality of serially connected processing stations is an input to another of the plurality of serially connected processing stations; and
  a shader register file directly connected only to a first processing station in the plurality of serially connected processing stations and to no other processing station in the shader or processing engine,
  wherein each one of the processing stations is configured to forward results to the shader register file through the first processing station by following a set of rules, including a first rule that a shader register write is performed for a first instruction when a second instruction that immediately follows the first instruction is a serialized instruction, and, a second rule that a shader register read is performed for a third instruction that immediately follows the second instruction,
  wherein the shader register file can only store the rasterized pixel data received directly from the first processing station, and
  wherein the shader register file can only send stored rasterized pixel data directly to the first processing station.

15. A graphics processing integrated circuit according to claim 14, further including a scheduler for sending programming commands to program the processing engine.

16. A graphics processing integrated circuit according to claim 14, wherein the plurality of serially connected processing stations loop such that the rasterized pixel data can be passed from a top processing station to a bottom processing station, and then from the bottom processing station to the top processing station, wherein data is passed via intermediate processing stations residing between the top processing station and the bottom processing station.

17. A graphics processing integrated circuit according to claim 16, wherein the rasterized pixel data from any processing station of the plurality of serially connected processing stations can be stored in the shader register file only by the first processing station.

18. A graphics processing integrated circuit according to claim 14, wherein the shader is further comprising:
a shader distributor configured to distribute data to a buffer memory and to the processing engine, wherein the data distributed to the buffer memory is state data that contains control data not used by the processing engine; and
a shader collector configured to receive buffered data from the buffer memory and processed data from the processing engine, and further configured to organize the buffered data to properly match the processed data.

19. A graphics processing integrated circuit according to claim 14, wherein the shader register file is only addressable by the first processing station.

20. A method of operating a shader, comprising the steps of:
receiving data in a first processing station;
processing the received data in the first processing station;
sending the processing results of the first processing station directly to a second processing station;
processing the processing results of the first processing station in the second processing station;
sending the processing results of the second processing station directly to a third processing station;
processing the processing results of the second processing station in the third processing station;
forwarding the processing results of the second processing station through the third processing station to the first processing station based on a set of rules, including a first rule that a shader register write is performed for a first instruction when a second instruction that immediately follows the first instruction is a serialized instruction, and, a second rule that a shader register read is performed for a third instruction that immediately follows the second instruction; and
selectively storing the processing results of the second processing station in the shader register file, wherein the shader register file is directly coupled to the first processing station.

21. A method of operating a shader according to claim 20, further including a step of programming the first, second, and third processing stations.

22. A method of operating a shader according to claim 21, further including the step of sending the processing results of the third processing station to the first processing station.

* * * * *